United States Patent [19]

Makishima et al.

[11] 4,279,653
[45] Jul. 21, 1981

[54] INK COMPOSITION FOR INK JET RECORDING

[75] Inventors: Hiroshi Makishima; Tsunehiko Toyoda; Noriaki Okamura, all of Yokohama; Hirofumi Yano, Kamakura; Akira Mizoguchi, Yamato; Yasutaka Hiromori, Kawasaki, all of Japan

[73] Assignees: Dai Nippon Toryo Co., Ltd.; Matsushita Electric Industrial Co., Ltd., both of Japan

[21] Appl. No.: 139,166

[22] Filed: Apr. 7, 1980

Related U.S. Application Data

[63] Continuation-in-part of Ser. No. 747,792, Dec. 6, 1976, abandoned.

[30] Foreign Application Priority Data

Dec. 5, 1975 [JP] Japan .................................. 50-145583

[51] Int. Cl.³ ............................................. C09D 11/00
[52] U.S. Cl. ........................................ 106/22; 106/20
[58] Field of Search ........................ 106/20, 21, 22, 23

[56] References Cited

U.S. PATENT DOCUMENTS

| | | | |
|---|---|---|---|
| 1,844,199 | 2/1932 | Bicknell et al. | 106/22 |
| 3,238,047 | 8/1966 | Murray et al. | 106/21 |
| 3,705,043 | 12/1972 | Zabiak | 106/20 |
| 3,846,141 | 11/1974 | Ostergren et al. | 106/22 |
| 3,994,736 | 11/1976 | Hertz et al. | 106/22 |

Primary Examiner—Lorenzo B. Hayes
Assistant Examiner—Amelia B. Yarbrough
Attorney, Agent, or Firm—Bucknam and Archer

[57] ABSTRACT

An ink composition for ink jet recording consisting essentially of a water-soluble wetting agent, water, a water-soluble dye and an oxygen absorber.

2 Claims, 4 Drawing Figures

INK COMPOSITION FOR INK JET RECORDING

This application is a continuation-in-part of U.S. Ser. No. 747,792 filed Dec. 6, 1976 now abandoned.

BACKGROUND OF THE INVENTION

The present invention relates to an improved ink composition for ink jet recording, which is used for an ink jet recording apparatus for performing recording by jetting ink drops in response to electric signals to cause the ink to adhere onto a recording medium.

In order for an ink for ink jet recording to be jetted in drops stably at high speeds, the ink should have the following properties at temperatures approximating room temperature:
(1) Viscosity: lower than 5 cps
(2) Surface tension: 40-50 dyne/cm
(3) Amount of dissolved air: less than about 0.013 ml/ml Inks disclosed in the specifications of U.S. Pat. No. 3,846,141 and British Pat. No. 1,378,894 satisfy the requirements for the viscosity and surface tension among the above three requirements. Namely, in an ink comprising water, a water-soluble wetting agent and a water-soluble dye, an ink comprising a water-soluble solvent in addition to the foregoing basic components and an ink further comprising a minute amount of a surface active agent, it is possible to reduce the viscosity below 5 cps and adjust the surface tension to 40-50 dyne/cm. However, in conventional ink compositions for ink jet recording, no adjustment of the amount of dissolved air is made. If the amount of dissolved air is too large, increase of the pressure for jetting cannot be precisely transferred through the ink, and therefore, it becomes difficult to perform recording precisely in response to electric signals.

SUMMARY OF THE INVENTION

The present invention relates to an ink composition for ink jet recording which can be jetted stably in drops at a high speed.

More specifically, the present invention relates to an ink composition for ink jet recording which consists essentially of a water-soluble wetting agent (binder), water, a water-soluble dye and an oxygen absorber.

DETAILED DESCRIPTION OF THE PREFERRED EMBODIMENTS

Various apparatuses have been known for ink jet recording, and the ink composition of the present invention can be applied to these known apparatuses. An instance of such ink jet recording apparatus will now be described by reference to FIG. 1.

Figure 1:
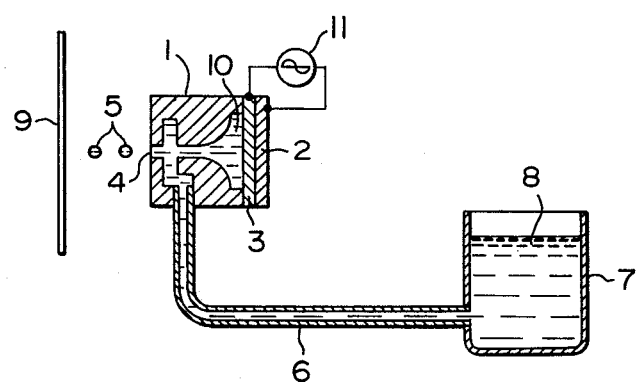
FIG. 1 is a diagram illustrating an embodiment of the ink jet recording apparatus for which the ink composition of the present invention is used.

Referring now to FIG. 1, a recording head 1 comprises a piezo-electric element 2, a vibrating plate 3 and an ink chamber 10. An ink 8 held in an ink vessel 7 is fed into the ink chamber 10 through an ink feed pipe 6 and the ink chamber 10 is filled with the ink 8. Reference numerals 4 and 5 represent a nozzle and an ink drop, respectively. The recording medium 9 is composed of paper, cloth, wood or the like.

In the recording apparatus having the above structure, when an electric signal 11 is applied between the piezo-electric element 2 and the vibrating plate 3, the piezo-electric element 2 causes vibrations in response to the applied electric signal to increase the pressure in the ink 8 contained in the ink chamber 10. By this pressure increase, the ink 8 is jetted from the nozzle 4 in the form of liquid drops 5, and the jetted ink drops 5 adhere onto the surface of the recording medium 9 to form thereon an image corresponding to the electric signal. This ink jet recording apparatus is detailed in the specifications of U.S. Pat. No. 3,747,120 and U.S. Pat. No. 3,940,773.

In an ink jet recording apparatus of this type, for example, in order to record an original image having an A-4 size and a resolving degree of 6 lines per mm for 2 minutes, it is necessary for the recording head 1 to stably jet ink drops 5 in response to electric signals corresponding to image signals having a frequency lower than 10 KHz. For attaining this feature, repeated increase of the pressure by vibrations of the piezo-electric element 2 must be faithfully transferred through the ink 8.

When the ink used has a high viscosity, the resistance is enhanced on the wall surface of the ink chamber or the nozzle portion to cause pressure loss and hence, faithful transfer of the pressure is impossible. The influence of the surface tension of the ink on jetting of the ink is not serious, but too high a surface tension, of course, must be avoided. If the surface tension of the ink is too low, running of the ink takes place on the recording medium.

In the case where the amount of dissolved air in the ink is large, the higher the frequency of repetition of increase of the pressure, the more the ink comes to have properties as a compressible fluid and the more the transfer of increase of the pressure is delayed.

As is seen from the foregoing illustration, when the viscosity of the ink is high or the amount of dissolved air is large, it is impossible to transfer the increase of the pressure faithfully and as a result, it is impossible to perform recording faithfully in response to electric signals.

For the reasons set forth above, in order to jet ink drops stably at a high speed under the abovementioned recording conditions, an ink to be used for ink jet recording must satisfy the following requirements concerning physical properties at temperatures approximating room temperature:
(1) Viscosity: lower than 5 cps
(2) Surface tension: 40-50 dyne/cm
(3) Amount of dissolved air: less than about 0.013 ml/ml It is a primary object of the present invention to provide an ink composition for ink jet recording, in which the foregoing requirements are sufficiently satisfied and especially in which the amount of dissolved air can be maintained at a very low level.

In general, the solubility of air in water is 0.0183 ml/ml as measured at 20° C. and one atmosphere, and it is known that this water solubility consists of a solubility of oxygen which is 0.0064 ml/ml and a solubility of nitrogen which is 0.0119 ml/ml.

We measured the solubility of air in an ink composition comprising water, a water-soluble wetting agent, a water-soluble dye and a water-soluble solvent and satisfying the foregoing requirements of the viscosity and surface tension, and as a result, it was found that the solubility of air in such ink composition is substantially equal to the solubility in water.

As a result of our experiments, it was confirmed that when ink jet recording is carried out by using a recording head as shown in FIG. 1, if the amount of dissolved air is larger than 0.013 ml/ml, the response characteristic of the recording head is degraded.

Figure 3:
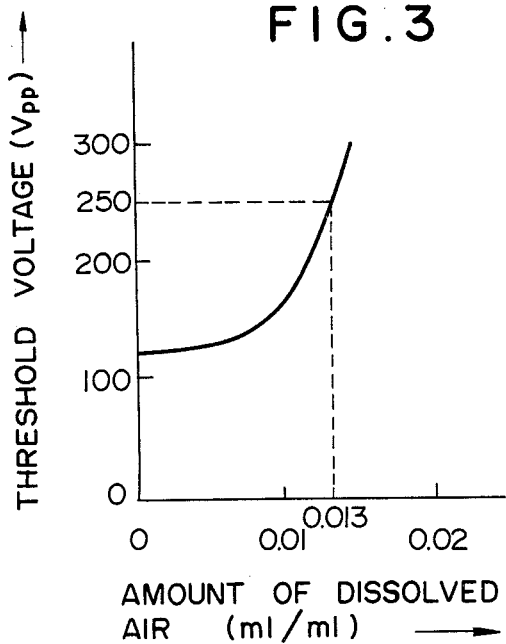
FIG. 3 is a graph illustrating an instance of the relation between the amount of dissolved air in an ink and the threshold voltage of a recording head.

When the driving voltage of the recording head exceeds 250 Vpp, air bubbles are readily sucked in the head from the nozzle and jetting of the ink particles becomes unstable. As will be apparent from FIG. 3 illustrating the influence of the amount of dissolved air in the ink on the minimum driving voltage (threshold voltage) for jetting of the ink particles, as the amount of dissolved air increases, in order to jet the ink particles, it is necessary to raise the driving voltage, and if the amount of the dissolved air exceeds 0.013 ml/ml, the threshold voltage for jetting of the ink particles is higher than 250 Vpp and it becomes impossible to perform recording stably.

Figure 2:
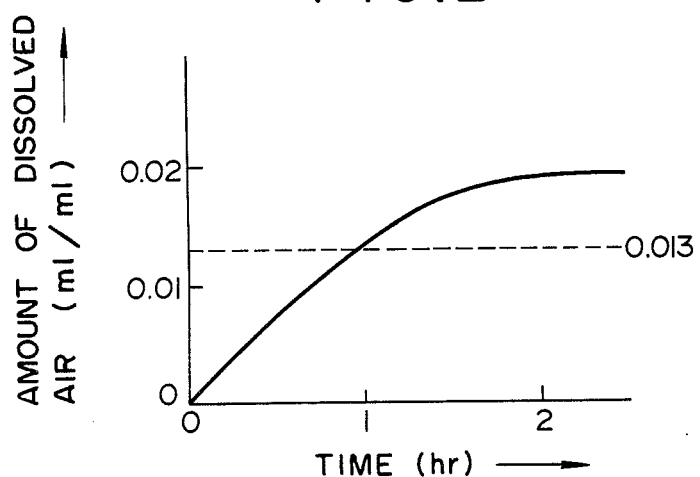
FIG. 2 is a graph illustrating the relation between the amount of dissolved air in an ink and the standing time, which is observed when the ink from which dissolved air has been removed by a degasification treatment such as boiling is allowed to stand in air.

When an ink composition satisfying the foregoing requirements for viscosity and surface tension was subjected to a degasification treatment such as boiling so that the requirement for the amount of dissolved air was satisfied and the degasified ink composition was allowed to stand in the ink jet recording apparatus shown in FIG. 1, it was found that the amount of dissolved air in the ink composition increased with the lapse of time as shown in FIG. 2 and the amount of dissolved air in the ink composition was as large as 0.013 ml/ml after the lapse of about 1 hour.

Figure 4:
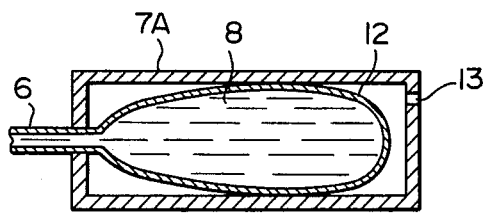
FIG. 4 is a diagram illustrating an ink vessel composed of a plastic film which is used for intercepting air from an ink.

Some of us previously proposed an ink vessel as shown in FIG. 4 as means for eliminating the above disadvantage. Referring to FIG. 4, in this ink vessel, air is shut out from an ink 8 by a plastic film bag 12.

Resins having a low gas permeability, such as vinylidene chloride-vinyl chloride copolymers, vinylidene chloride-acrylonitrile copolymers, polyvinylidene chloride-coated nylon resins and polyvinylidene chloride-coated polyester resins, are preferably employed for formation of the plastic film bag 12. For example, when a vinylidene chloride-vinyl chloride copolymer (KREHALON®) manufactured by Kureha Plastics Co., Ltd.), which is one of the materials having a lower gas permeability among those mentioned, was shaped into a film having a thickness of 40μ and the film was used as the film bag 12, the amount of dissolved air increased at a rate of about 0.002 ml/ml/day, and in case of an ink composition formed by removing an oxygen absorber from an ink composition of Example 3 given hereinafter, the life of the ink composition was prolonged by about 1 week.

However, no plastic material is capable of completely shutting out gases, and such prolongation of the ink life is of no significance from the practical viewpoint.

From the experimental results shown in FIG. 2, we found that the critical lower value of the amount of air dissolved in an ink is substantially equal to the solubility of nitrogen of dissolved air in the ink and the influence of dissolved air can be substantially eliminated if dissolved oxygen is removed from dissolved air. It was also found that this can be accomplished by removing oxygen which is continually being dissolved in the ink.

This removal of dissolved oxygen, in general, may be accomplished by a physical method or chemical method. According to the former physical method, oxygen is removed by boiling or pressure reduction, but it is difficult to perform the treatment continuously and maintain the intended effect for a long time according to this physical method. Therefore, we conducted research on a chemical method for removal of dissolved oxygen, and as a result, we found that dissolved oxygen can be effectively removed without any harmful influence on the quality of an ink by incorporation of a specific oxygen absorber. Based on this finding, we have now completed the present invention.

In the present invention, a substance capable of chemically reacting with oxygen dissolved in an ink is used as an oxygen absorber. As such substance, there can be mentioned various compounds, for example, metals such as iron chips, sulfites such as sodium sulfite, ammonium sulfite, potassium sulfite, sodium hydrogensulfite, potassium hydrogensulfite and ammonium hydrogensulfite, polyhydric phenols such as pyrogallol, and other reducing agents such as sodium trithionite and hydrazine. However, in order for these substances to be effectively used in the present invention, they must satisfy various requirements. For example, they must be easily soluble in an ink, they must not change the color of the ink, they must not generate nitrogen gas or the like by reaction with oxygen, and they must not form precipitates. In view of these requirements, sulfites such as sodium sulfite, ammonium sulfite, potassium sulfite, sodium hydrogensulfite, potassium hydrogensulfite and ammonium hydrogensulfite are most preferred as oxygen absorbers. For example, when sodium sulfite is used as the oxygen absorber, it absorbs oxygen according to the following reaction:

$$2Na_2SO_3 + O_2 = 2Na_2SO_4 \qquad \text{(formula 1)}$$

When water, a polyhydric alcohol as a water-soluble wetting agent, a water-soluble dye and sodium sulfite are placed in an ink vessel of a vinylidene chloride-vinyl chloride copolymer as shown in FIG. 4, the amount of air permeating the film vessel is 0.002 ml/ml/day and the portion accounted for oxygen is 0.0007 ml/ml/day. Accordingly, the amount of sodium sulfite in the ink composition necessary for absorbing the thus dissolved oxygen is $7.9 \times 10^{-6}$ g/ml/day. In order to maintain the amount of dissolved oxygen in the ink composition at a level of 0.0007 ml/ml, sodium sulfite must be incorporated into the ink composition in an amount of about 0.5% by weight. In some ink compositions, this critical concentration of sodium sulfite is higher than 0.5% by weight. In an ink composition containing sodium sulfite in an amount larger than the above critical value, the amount of oxygen dissolved in the ink composition is maintained at a very low level and this effect is manifested until all of sodium sulfite incorporated is consumed. For example, if sodium sulfite is incorporated in an amount of 1% by weight, the life of the ink is about 630 days. However, if the amount of sodium sulfite incorporated exceeds 10% by weight, the ink is readily dried to cause clogging of the nozzle.

The water-soluble wetting agent that is used in the present invention includes polyhydric alcohols which are liquid at temperatures approximating room temperature, such as glycerin, ethylene glycol, polyethylene glycol, propylene glycol, methyl glucoside, trimethylolpropane, trimethylolethane, neopentyl glycol, sorbitol and mannitol, alkyl ethers of aliphatic polyhydric alcohols, which are liquid at temperatures approximating room temperature, such as ethylene glycol monomethyl ether, ethylene glycol monoethyl ether, ethylene glycol monobutyl ether, diethylene glycol diethyl ether, diethylene glycol monobutyl ether, ethoxy glycol, monopropylene glycol methyl ether, dipropylene glycol methyl ether and tripropylene glycol methyl ether, mono-acetates of alkyl ethers of aliphatic polyhydric alcohols, which are liquid at temperatures approximating room temperature, such as ethylene glycol monomethyl ether acetate, diethylene glycol monomethyl ether acetate and diethylene glycol monoethyl ether acetate, hydroxyalkyl formamides which have 1 to 4 carbon atoms in the alkyl group, and N-vinyl-2-pyrrolidone oligomers which are liquid at temperatures approximating room temperature.

These water-soluble wetting agents may be used singly or in the form of mixtures of two or more of them.

The above-mentioned N-vinyl-2-pyrrolidone oligomers can be synthesized by adding concentrated sulfuric acid as a catalyst in an amount of 0.05 to 5% by weight based on the N-vinyl-2-pyrrolidone monomer in the state diluted with substantially the same amount of acetic acid and perform oligomerization at 10 to 100° C. in a solvent such as benzene.

In the present invention, a water-soluble organic solvent is incorporated in the ink composition according to need. As such solvent, there are preferably employed dioxane, acetone, diacetone alcohol, cellosolves, carbitols, alcohols having 1 to 3 carbon atoms, pyridine, dimethylformamide, dimethylsulfoxide and N-methyl-2-pyrrolidone.

Any of water-soluble dyes having such property that color change or formation of precipitates is not caused by incorporation of an oxygen absorber such as mentioned above can be used in the present invention. For example, there are employed C. I. Direct Blue 236, C. I. Direct Blue 203, C. I. Direct Blue 202, C. I. Direct Blue 15, C. I. Acid Blue 7, C. I. Acid Blue 9, C. I. Acid Yellow 1, C. I. Direct Red 227, C. I. Direct Red 225, C. I. Acid Red 87, C. I. Acid Red 92, C. I. Acid Red 52, C. I. Direct Black 51, Direct Deep Black (manufactured by Mitsubishi Kasei), Chlorazol Viscose Black B450 (manufactured by ICI), Nigrosine G 140 (manufactured by ICI), Benzo Nerol VSF (manufactured by Bayer) and Alcohol Mazenta (manufactured by Shirado Kagaku). These water-soluble dyes may be used singly or in the form of mixtures of two or more of them.

In the present invention, any antiseptic or fungicide which is water soluble and does not cause the formation of a precipitate may be used. Examples of antiseptics and fungicides include 1-(3-chloroallyl)-3,5,7-triaza-1-azoniaadamantane chloride, 2-(hydroxy methyl amino) ethanol, hexahydro-1,3,5-tri(2-hydroxy ethyl)-s-triazine, hexahydro-1,3,5-triethyl-s-triazine, amine salts or alkali metal salts of 1,2-benzoisothiazolin-3-one, amine salts or alkali metal salts of 2-n-octyl-4-isothiazolin-3-one, dehydro abietyl amine acetate, amine salts or alkali metal salts of 3-methyl-4-chlorophenol, amine salts or alkali metal salts of p-chloro-m-xylenol, 1-oxy-3-methyl-4-isopropylbenzene, 2-phenyl phenol, sodium dehydroacetate, 2-pyridine thiol-1-oxide. These compounds are used individually or in mixtures of two or more.

If necessary, a surface tension adjusting agent may be incorporated into the ink composition of the present invention. As the surface tension adjusting agent, there can be used, for example, cationic surface active agents such as sodium alkyl sulfates, anionic surface active agents such as alkyl pyridium sulfates, non-ionic surface active agents such as polyoxyethylene alkyl ethers, and amphoteric surface active agents.

Moreover, the ink composition of the present invention may further comprise a viscosity modifier according to need. As the viscosity modifier, there can be mentioned, for example, cellulose derivatives such as hydroxypropyl cellulose, carboxymethyl cellulose and hydroxyethyl cellulose, and water-soluble resins such as polyvinyl alcohol, polyvinyl pyrrolidone, acrylic resins, styrene-acrylic copolymers and styrene-maleic acid copolymers.

The presence of $Cu^{++}$ ion as a catatyst is effective for promoting the reaction represented by the above reaction formula 1.

The ink composition of the present invention preferably comprises 5 to 40% of a water-soluble wetting agent, 0.1 to 10% by weight of a water-soluble dye, and 0.5 to 10% by weight of an oxygen absorber, an antiseptic and/or fungicide, with the balance being water. The content of the antiseptic and/or fungicide is 300 to 5000 ppm. According to need, up to 50% by weight of water may be replaced by a water-soluble organic solvent such as mentioned above. Further, small amounts of a surface active agent, a viscosity modifier and the like may be incorporated in the ink composition of the present invention according to need.

It has been found that, under ordinary conditions, a mold may be formed within one or two months in a ink composition which includes no antiseptic and/or fungicide and this causes the clogging of the nozzle. On the other hand the ink compositions according to the present invention are very stable so that no formation of mold is observed even after a period of time of one year or longer.

As will be apparent from the foregoing illustration, according to the present invention, there is provided an ink composition in which a viscosity of 1 to 5 cps, a surface tension of 40 to 50 dyne/cm and a very low concentration of dissolved oxygen can always be maintained at temperatures approximating room temperature. When this ink composition is used for ink jet recording, it is possible to jet ink drops stably at a high speed in an ink jet recording apparatus, and therefore, the application range of ink jet recording can be remarkably broadened according to the present invention.

The present invention will now be described in detail by reference to the following Examples that by no means limit the scope of the invention. In these Examples, experiments were conducted by using the ink jet recording apparatus shown in FIG. 4, but it must be noted that similar effects can be obtained by using other known ink vessels.

EXAMPLE 1

| Composition | % by weight |
| --- | --- |
| Polyethyleneglycol #300 (having a molecular weight of about 300) | 20 |
| Dye, C.I. Acid Red 92 | 5 |
| Distilled water | 73 |

-continued

| Composition | % by weight |
| --- | --- |
| Sodium sulfite | 2 |

The composition also contained 2000 ppm of sodium dehydroacetate.

A polyoxyethylene alkyl ether type surface active agent as a surface tension adjusting agent was incorporated in the above composition, being at a concentration lower than 2000 ppm. The resulting ink composition had a surface tension of 40 dyne/cm and a viscosity of 2.5 cps at room temperature (25° C.).

The so-prepared ink composition was placed in an ink vessel as shown in FIG. 4 and used for ink jet recording. The threshold voltage was 100–150 Vpp. Even after the ink composition had been stored for 18 months, the amount of dissolved oxygen was smaller than 0.0007 m/ml and the threshold voltage was lower than 250 Vpp. Thus, it was confirmed that the ink composition retained the original excellent jetting property (adaptability to ink jet recording) even after 18 months' storage. Further, formation of precipitates or change of the color was not observed during storage.

EXAMPLE 2

| Composition | % by weight |
| --- | --- |
| Diethylene glycol | 15 |
| Dye, C.I. Direct Blue 202 | 2 |
| Distilled water | 82 |
| Sodium sulfite | 1 |

The composition also contained 1500 ppm of 2-(hydroxymethylamino) ethanol.

In the same manner as in Example 1, the surface tension adjusting agent was incorporated into the above composition. The resulting ink composition had a surface tension of 45 dyne/cm and a viscosity of 1.7 cps at room temperature.

When the ink composition was subjected to the jetting test after 18 months' storage and properties were examined in the same manner as in Example 1, results as excellent as those obtained in Example 1 were similarly obtained.

EXAMPLE 3

| Composition | % by weight |
| --- | --- |
| Glycerin | 10 |
| Ethylene glycol monoethyl ether | 10 |
| Dye, Direct Deep Black (manufactured by Mitsubishi Kasei) | 1 |
| Distilled water | 77 |
| Sodium sulfite | 2 |

The composition also contained 2000 ppm of hexahydro-1,3,5-tri(2-hydroxy ethyl)-s-triazine.

In the same manner as in Example 1, the surface tension adjusting agent was incorporated in the above composition. The resulting ink composition had a surface tension of 42 dyne/cm and a viscosity of 1.5 cps at room temperature.

In the same manner as described in Example 1, the ink composition was subjected to the jetting test after 18 months' storage and properties were examined. Obtained results were as excellent as those obtained in Example 1.

EXAMPLE 4

| Composition | % by weight |
| --- | --- |
| Glycerin | 20 |
| Dye, C.I. Acid Blue 9 | 2.5 |
| Distilled water | 72.5 |
| Sodium sulfite | 5.0 |

The composition also contained 1700 ppm of dehydro abietyl amine acetate.

In the same manner as in Example 1, the surface tension adjusting agent was incorporated into the above composition. The resulting ink composition had a surface tension of 48 dyne/cm and a viscosity of 1.8 cps.

In the same manner as described in Example 1, the ink composition was subjected to the jetting test after 18 months' storage and properties were examined. Obtained results were as excellent as those obtained in Example 1.

EXAMPLE 5

| Composition | % by weight |
| --- | --- |
| Polyethylene glycol #300 (having a molecular weight of about 300) | 14 |
| Diethylene glycol | 25 |
| Dye, C.I. Acid Blue 9 | 3 |
| Distilled water | 57 |
| Sodium sulfite | 1 |

The composition also contained 1200 ppm of hexahydro-1,3,5-triethyl-s-triazine.

In the same manner as in Example 1, the surface tension adjusting agent was incorporated into the above composition. The resulting ink composition had a surface tension of 40 dyne/cm and a viscosity of 2.6 cps.

In the same manner as described in Example 1, the ink composition was subjected to the jetting test after 18 months' storage and properties were examined. Obtained results were as excellent as those obtained in Example 1.

EXAMPLE 6

The following various compositions were prepared.

| Composition A | % by weight |
| --- | --- |
| Polyethylene glycol #600 (having a molecular weight of 600) | 20.0 |
| Dye, C.I. Direct Blue 15 | 1.0 |
| Distilled water | 76.0 |
| Ammonium hydrogensulfite | 3.0 |

The composition also contained 1000 ppm of diethanol amine salt of 1,2-benzoisothiazolin-3-one.

| Composition B | % by weight |
| --- | --- |
| 1,5-Pentane diol | 17.6 |
| Dye, C.I. Direct Red 225 | 1.0 |
| Distilled water | 78.4 |
| Ammonium hydrogensulfite | 3.0 |

The composition also contained 700 ppm of sodium salt of 2-n-octyl-4-isothiazolin-3-one.

| Composition C | % by weight |
|---|---|
| Dipropylene glycol | 12.0 |
| Polyethylene glycol #300 (having a molecular weight of 300) | 15.0 |
| Dye, C.I. Acid Blue 9 | 1.0 |
| Distilled water | 71.0 |
| Potassium sulfite | 1.0 |

The composition also contained 1000 ppm of sodium dehydroacetate.

| Composition D | % by weight |
|---|---|
| Dipropylene glycol | 15.0 |
| Polyethylene glycol #600 (having a molecular weight of 600) | 5.0 |
| Polyvinyl pyrrolidone I (having a molecular weight of 40.000) | 1.0 |
| Dye, C.I. Acid Blue 9 | 1.0 |
| Distilled water | 75.0 |
| Ammonium sulfite | 3.0 |

The composition also contained 2000 ppm of 2-(hydroxy methylamino)-ethanol.

| Composition E | % by weight |
|---|---|
| 1,3-Butane diol | 20.5 |
| Glycerin | 4.0 |
| Polyvinyl alcohol (having a molecular weight of 500) | 0.5 |
| Dye, C.I. Direct Red 225 | 1.0 |
| Distilled water | 73.0 |
| Potassium sulfite | 1.0 |

The composition also contained 1500 ppm of 1-(3-chloroallyl)-3,5,7-triaza-1-azoniaadamantane chloride.

| Composition F | % by weight |
|---|---|
| Diethylene glycol | 15.0 |
| Sorbitol | 3.0 |
| Dye, C.I. Direct Blue 15 | 1.0 |
| Distilled water | 80.0 |
| Potassium sulfite | 1.0 |

The composition also contained 800 ppm of 2-pyridine thiol-1-oxide.

| Composition G | % by weight |
|---|---|
| Diethylene glycol | 15.0 |
| Sorbitol | 3.0 |
| Dye, Direct Red 225 | 1.0 |
| Distilled water | 78.0 |
| Ammonium hydrogensulfite | 3.0 |

The composition also contained 500 ppm of
2-(hydroxy methyl amino)ethanol
+
500 ppm of 2-phenyl phenol

| Composition H | % by weight |
|---|---|
| Glycerin | 18.0 |
| Hydroxypropyl cellulose | 1.0 |
| Dye, C.I. Direct Red 225 | 1.5 |
| Distilled water | 76.5 |
| Ammonium hydrogensulfite | 3.0 |

The composition also contained 1000 ppm of
1-oxy-3-methyl-4-isopropyl benzene
+
1000 ppm of 2-phenyl phenol

| Composition I | % by weight |
|---|---|
| Diethylene glycol monoethyl ether | 10.0 |
| Dye, C.I. Direct Blue 236 | 3.0 |
| Sodium sulfite | 1.0 |
| Distilled water | 86.0 |

The composition also contained 1000 ppm of
1-(3-chloroallyl)-3,5,7-triaza-1-azoniaadamantane chloride
+
1000 ppm of diethanol amine salt of
1,2-benzoisothiazolin-3-one

| Composition J | % by weight |
|---|---|
| Ethylene glycol monobutyl ether | 30.0 |
| Dye, C.I. Direct Red 225 | 2.0 |
| Potassium sulfite | 2.0 |
| Distilled water | 64.0 |
| Acetone | 2.0 |

The composition also contained 1000 ppm of
2-(hydroxy methyl amino)ethanol
+
500 ppm of hexahydro-1,3,5-triethyl-s-triazine

| Composition K | % by weight |
|---|---|
| Ethoxy glycol | 10.0 |
| Diethylene glycol methyl ether | 5.0 |
| Dye, C.I. Acid Blue 9 | 3.0 |
| Ammonium sulfite | 2.5 |
| N-Methyl-2-pyrrolidone | 3.0 |
| Distilled water | 76.5 |

The composition also contained 500 ppm of
hexahydro-1,3,5-tri(2-hydroxy ethyl)-s-triazine
+
500 ppm of 2-pyridine thiol-1-oxide

| Composition L | % by weight |
|---|---|
| Ethylene glycol monoethyl ether | 15.0 |
| Diethylene glycol monomethyl ether acetate | 5.0 |
| Dye, C.I. Acid Red 92 | 5.0 |
| Potassium sulfite | 1.0 |
| Distilled water | 74.0 |

The composition also contained 500 ppm of
sodium dehydroacetate
+
500 ppm of 2-pyridine thiol-1-oxide

| Composition M | % by weight |
|---|---|
| Ethylene glycol monoethyl ether acetate | 10.0 |
| Propylene glycol | 25.0 |
| Dye, C.I. Direct Blue 15 | 1.0 |
| Ammonium sulfite | 3.0 |
| Distilled water | 61.0 |

The composition also contained 300 ppm
of
2-phenyl phenol
+
1000 ppm of sodium dehydroacetate

| Composition N | % by weight |
|---|---|
| Tripropylene glycol methyl ether | 15.0 |
| Dye, C.I. Direct Blue 15 | 2.0 |
| Potassium sulfite | 7.0 |
| Distilled water | 76.0 |

The composition also contained 500 ppm of
diethanol amine salt of 1,2-benzoisothiazolin-3-one
+
500 ppm of sodium salt of
2-n-octyl-4-isothiazolin-3-one

| Composition O | % by weight |
|---|---|
| Diethylene glycol monobutyl ether | 20.0 |
| Dye, C.I. Acid Red 92 | 2.0 |
| Sodium sulfite | 1.0 |
| Distilled water | 77.0 |

The composition also contained 500 ppm of

-continued

| sodium dehydroacetate<br>+<br>500 ppm of 2-pyridine thiol-1-oxide | |
|---|---|
| Composition P | % by weight |
| N-Vinyl-2-pyrrolidone oligomer (having an average molecular weight of 300) | 5.0 |
| Dye, C.I. Direct Blue 202 | 2.0 |
| Sodium sulfite | 1.0 |
| Distilled water | 91.0 |
| Ethylene glycol | 1.0 |
| The composition also contained 1000 ppm of dehydro abietyl amine acetate<br>+<br>500 ppm of sodium dehydroacetate | |
| Composition Q | % by weight |
| β-Hydroxyethyl formamide | 10.0 |
| Dye, C.I. Direct Blue 15 | 2.5 |
| Potassium sulfite | 1.0 |
| Distilled water | 86.5 |
| The composition also contained 500 ppm of 1-(3-chloroally)-3,5,7-thiaza-1-azoniaadamantane chloride<br>+<br>500 ppm of 2-(hydroxy methyl amino)ethanol | |
| Composition R | % by weight |
| Ethylene glycol monobutyl ether | 13.0 |
| Glycerin | 5.0 |
| Hydroxypropyl cellulose (HPC-SL manufactured by Nippon Soda) | 1.0 |
| Dye, C.I. Direct Red 225 | 1.5 |
| Distilled water | 76.5 |
| Ammonium hydrogensulfite | 3.0 |
| The composition also contained 500 ppm of hexahydro-1,3,5-tri(2-hydroxy ethyl)-s-triazine<br>+<br>500 ppm of hexahydro-1,3,5-triethyl-s-triazine | |

In the same manner as in Example 1, the surface tension adjusting agent was incorporated into the foregoing compositions. It was found that each of the so prepared ink compositions had a surface tension of 40–50 dyne/cm and a viscosity lower than 5 cps at room temperature.

In the same manner as described in Example 1, these ink compositions were subjected to the jetting test after 18 months' storage and properties were examined. In each ink composition, obtained results were as excellent as in Example 1.

What we claim is:

1. An ink composition for ink jet recording which consists of 5 to 40% by weight of a water-soluble wetting agent, 0.1 to 10% by weight of a water-soluble dye, 0.5 to 10% by weight of at least one oxygen absorber selected from the group consisting of sodium sulfite, potassium sulfite, ammonium sulfite, sodium hydrogensulfite, potassium hydrogensulfite, and ammonium hydrogensulfite, and at least one member selected from the group consisting of antiseptics and fungicides with the balance being water, said at least one antiseptic or fungicide being water soluble and not causing the formation of a precipitate being included in an amount ranging from 300 to 5000 ppm in the total ink composition and the ink composition having a viscosity lower than 5 cps, a surface tension of 40 to 50 dyne/cm and an amount of dissolved air lower than 0.013 ml/ml at a temperature approximating room temperature.

2. An ink composition for ink jet recording as set forth in claim 1 wherein the water-soluble wetting agent is at least one member selected from the group consisting of polyols, alkylethers of aliphatic polyols, alkylether-monoacetates of aliphatic polyols, hydroxy alkyl formamides and N-vinyl-2-pyrrolidone oligomer.

* * * * *